US009791836B2

United States Patent
Bostick et al.

(10) Patent No.: US 9,791,836 B2
(45) Date of Patent: Oct. 17, 2017

(54) TELEVISION SYSTEM INCLUDING GLARE DETECTION AND REMEDIAL ACTION SYSTEM

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/831,959

(22) Filed: Aug. 21, 2015

(65) Prior Publication Data

US 2017/0054935 A1    Feb. 23, 2017

(51) Int. Cl.
*H04N 5/64* (2006.01)
*G05B 11/01* (2006.01)
*H04N 5/58* (2006.01)

(52) U.S. Cl.
CPC ............ *G05B 11/017* (2013.01); *H04N 5/58* (2013.01); *H04N 5/64* (2013.01)

(58) Field of Classification Search
CPC    H04N 5/72; H04N 5/44; H04N 5/445; H04N 5/58; H04N 5/64; G05B 11/017; G06F 7/04
USPC ................................ 348/552, 553, 563, 734
See application file for complete search history.

(56) References Cited

U.S. PATENT DOCUMENTS

| | | | |
|---|---|---|---|
| 4,587,459 A | 5/1986 | Blake | |
| 8,115,877 B2* | 2/2012 | Blatchley | G06F 1/1601 345/158 |
| 2007/0247717 A1* | 10/2007 | Konno | G02B 27/01 359/613 |
| 2010/0052847 A1 | 3/2010 | Mortensen | |
| 2014/0318716 A1 | 10/2014 | Patel | |

FOREIGN PATENT DOCUMENTS

WO    2013153475 A1    10/2013

OTHER PUBLICATIONS

Cloninfer, Janet, "Turn your existing blinds into motorized blinds with this Kickstarter project", the gadgeteer, Sep. 22, 2014, pp. 1-7, Retrieved from the Internet: http://the-gadgeteer.com/2014/09/22/turn-your-existing-blinds-into-motorized-blinds-with-this-kickstarter-project.

Lee et al., "Self-Adjusting Window Shade", Cornell University, pp. 1-22, retrieved Jul. 16, 2015; retrieved from the Internet: http://people.ece.cornell.edu/land/courses/ece4760/FinalProjects/s2009/awI9_hc352/awI9_hc352/.

(Continued)

*Primary Examiner* — Trang U Tran
(74) *Attorney, Agent, or Firm* — Cantor Colburn LLP

(57) ABSTRACT

A television system includes a housing including a television screen, a glare detector arranged in the housing and configured and disposed to detect an origination point of a glare on one of a television screen and a viewer, and a glare remediation system operatively coupled to the glare detector and one or more window covering devices. The glare remediation system is configured and disposed to close the one of the one or more window covering devices at the origination point upon detecting the glare at the one of the television screen and the viewer.

11 Claims, 2 Drawing Sheets

(56) References Cited

OTHER PUBLICATIONS

Mathematics Stack Exchange, "How to calculate reflected light angle?", pp. 1-3, retrieved Jul. 16, 2015, retrieved from the Internet: http://math.stackexchange.com/questions/1844/how-to-calculate-reflected-light-angle.
N.A., "Now there are smart Blinds that automatiaclly adjust based on light", Pinterest, pp. 1, retrieved Jul. 16, 2015, retrieved from the Internet: https://www.pinterest.com/pin/287526757434132478/.
Summers, Alex, "Using Blinds to Control the Temperature of Your Home", pp. 1-5, Oct. 4, 2013, retrieved from the Internet: http://www.triplepundit.com/podium/blinds-control-temperature-home/.
Woollaston, Victoria, "Make your blinds Smart: Clip-on gadget automatically adjusts Venetians according to daylight and temperature", DailyMail.com, Feb. 13, 2014, pp. 1-21, retrieved from the Internet: http://www.dailymail.co.uk/sciencetech/article-2558443/Make-blinds-SMART-Clip-gadget-automatically-adjusts-Venetians-according-daylight-temperature.html.

\* cited by examiner

TELEVISION SYSTEM INCLUDING GLARE DETECTION AND REMEDIAL ACTION SYSTEM

BACKGROUND

The present invention relates to television systems and, more specifically, to a television system including a glare detection and remedial action system.

Televisions are ubiquitous in modern society. Almost every family has one or more televisions. Many families will install a television in a central room for viewing. Often times, the central room includes windows that, depending upon season, period of day, etc., may cast a glare on the television or a viewer. The glare may detract from an overall viewing experience. In order to reduce the glare, a viewer will generally close blinds, shades, or the like to reduce incident sunlight. Often times, it may be difficult to determine from which window the glare originates. As such, the viewer may have to make multiple attempts and close/open multiple blinds or shades to reduce and/or eliminate the glare. Several failed attempts at reducing and/or eliminating the glare could lead to enhanced frustration for the viewer.

SUMMARY

According to an exemplary embodiment, a television system includes a housing including a television screen, a glare detector arranged in the housing and configured and disposed to detect an origination point of a glare on one of a television screen and a viewer, and a glare remediation system operatively coupled to the glare detector and one or more window covering devices. The glare remediation system is configured and disposed to close the one of the one or more window covering devices at the origination point upon detecting the glare at the one of the television screen and the viewer.

According to another aspect of an exemplary embodiment, a computer-implemented method of detecting and eliminating glare at a television system includes detecting a glare on one of a television screen and a viewer of the television system at the television system, determining an origination point of the glare, and closing a window covering device associated with the origination point.

According to yet another aspect of an exemplary embodiment, a computer program product for detecting and mitigating glare at one of a television system and a viewer is provided. The computer program product includes a computer readable storage medium having computer readable program instructions embodied therewith. The computer readable program instructions are executable by a processor to perform a method including detecting a glare on one of a television screen and a viewer of the television at the television system, determining an origination point of the glare, and closing a window covering device associated with the origination point.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
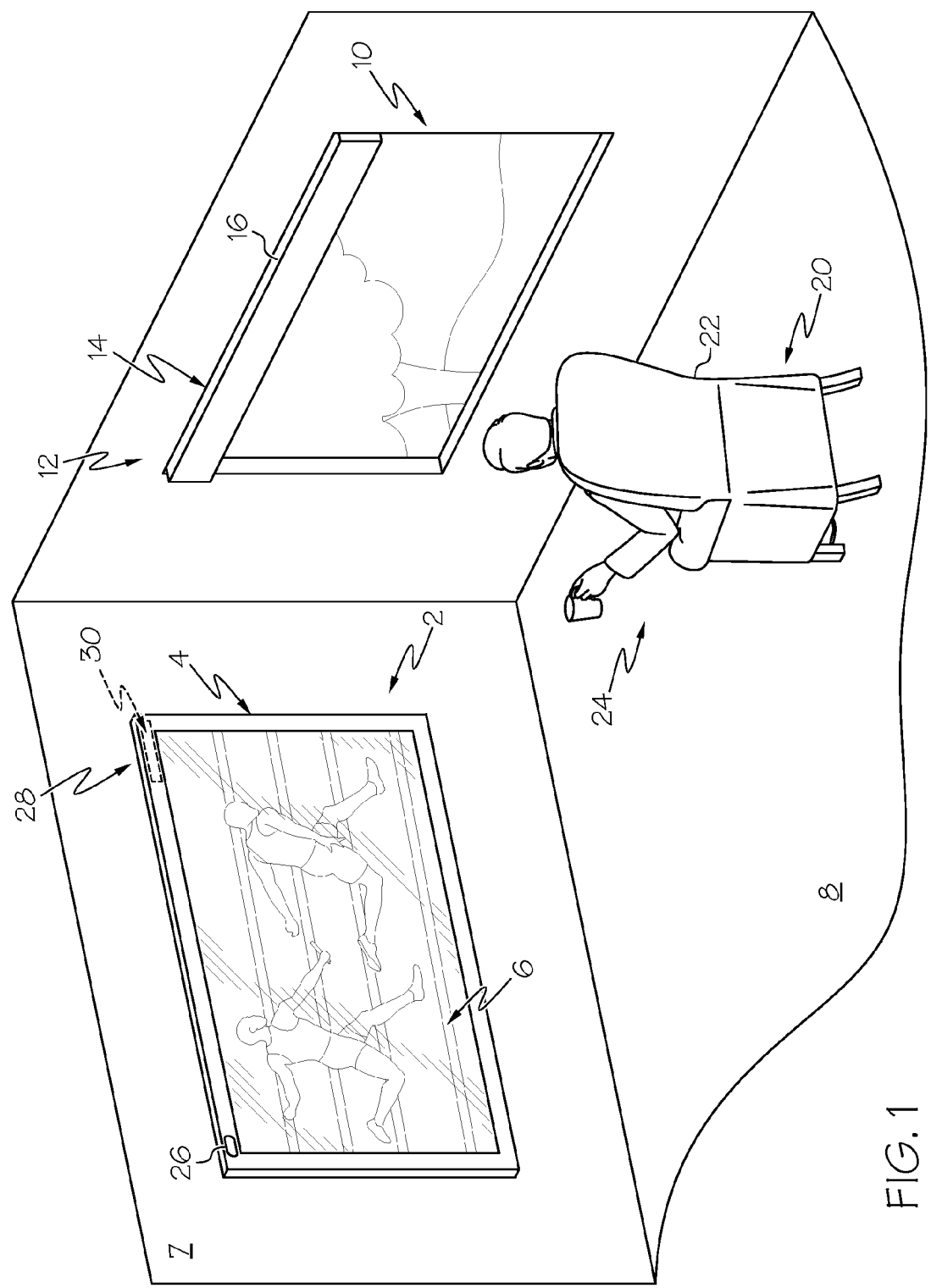
FIG. 1 is a partial perspective view of a television system including a glare detection and mitigation system, in accordance with an exemplary embodiment, mounted in a room.

With reference now to FIG. 1, a television system, in accordance with an exemplary embodiment, is indicated generally at 2. Television system 2 includes a housing 4 and a television screen 6. In the exemplary embodiment shown, television system 2 is mounted to a wall 7 in a room 8. It should however be understood that television system 2 may be supported in a wide array of installations and should not be considered to be limited to wall mounted/supported units.

Room 8 includes a window 10 having a window covering device 12 shown in the form of an indoor window treatment 14. Window treatment 14 is shown in the form of motorized blinds 16. However, it should be understood that window treatment 14 may take on a variety of forms. Room 8 is further shown to include a seating device 20 which may take the form of a chair or sofa 22 for supporting a viewer 24 engaged in watching television system 2. Television system 2 may also include an image capture device or camera 26 that may capture images of viewer 24.

Figure 2:
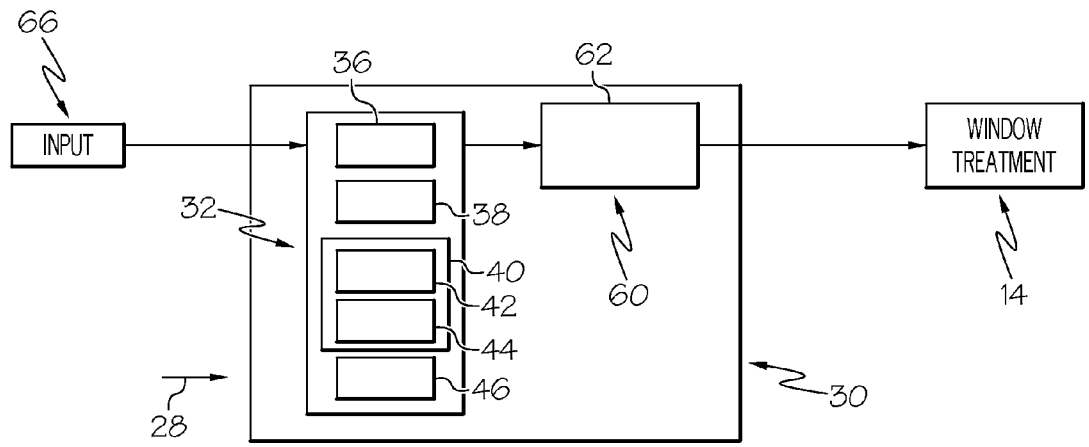
FIG. 2 depicts a block diagram of the glare detection and mitigation system, in accordance with an exemplary embodiment.

In accordance with an exemplary embodiment, television system 2 includes a glare detection and mitigation system 28 arranged in housing 4. As seen in FIG. 2, glare detection and mitigation system 28 includes a controller 30 having a system processor 32. Glare detection and mitigation system 28 further includes a glare detector 36 which, as will be detailed more fully below, detects a glare on one, the other, or both of television screen 6 and viewer 24. Glare detection and mitigation system 28 also includes a glare remediation system 38 and a computer readable storage medium 40 that stores and maintains computer readable program instructions 42 as well as a solar position look-up table 44. Further, glare detection and mitigation system 28 includes a memory 46 and wireless communication device 60 that may take the form of a Bluetooth® communication device 62 that is capable of wireless communication with, and control of, window treatment 14.

In accordance with an aspect of an exemplary embodiment, viewer 24 or another user, may set up glare detection and mitigation system 28 through an input device or remote control 66. Viewer 24 may input an orientation of television screen 6, number and location of windows 10, geographic location or global positioning system (GPS) coordinates of room 8, and/or a position of chair 22 into, for example, memory 46. Viewer 24 may also input date and time information. In this manner, glare detector 36 may determine the presence of a glare. For example, glare detector 36 may scan solar position look-up table 44 to determine sun position for a particular date, during a particular season, at a particular time. Glare detector 36 may then compare sun position with a location of television screen 6, window(s) 10, and chair 22 to determine whether a glare can be expected. Glare detector 36 may also rely on inputs from camera 26. For example, glare detector 36 may be operatively associated with object detection/identification algorithms stored on computer readable storage medium 40 and/or in memory 46. In such a case, glare detector 36 may interpret images captured by camera 26 and evaluate viewer gestures, for example eye shading, squinting, body position, or pre-set signals that can be deemed to indicate a presence of a glare.

Figure 3:
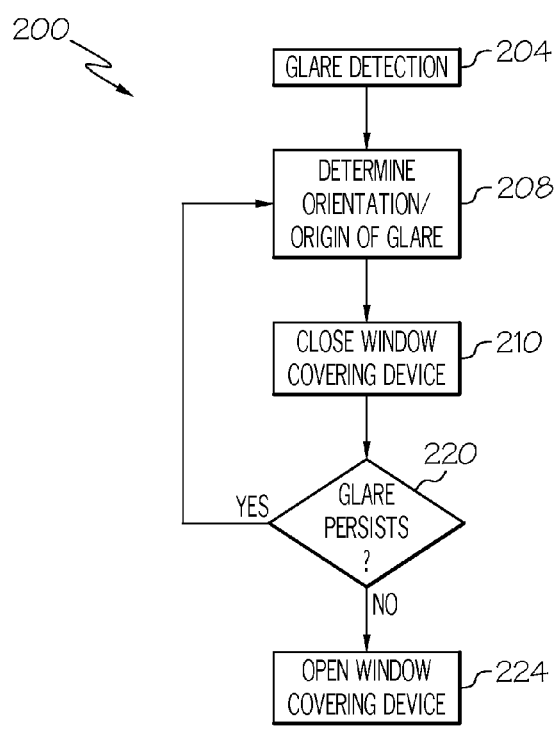
FIG. 3 depicts a flow chart illustrating a method of detecting and mitigating glare, in accordance with an exemplary embodiment.

Reference will be made to FIG. 3 in describing a method 200 of detecting and mitigating glare in accordance with an aspect of an exemplary embodiment. In block 204 a glare is detected on at least one of television screen 6 and viewer 24. The glare may be detected by glare detector 36 as described above. Once a determination is made that a glare is likely to exist, glare detector 36 determines an orientation or origin of the glare in block 208. For example, relying upon input data as well as data from solar position look-up table 44, glare detector 36 may determine which window or windows 10 provide a pathway for solar rays which may create the glare.

Glare detector 36 communicates the orientation information to glare remediation system 38 which, in turn, communicates with an appropriate one of window treatment(s) 14 to cover the corresponding window 10 in block 210. In this manner, the glare may be removed without disturbing viewer 24 or requiring multiple attempts to determine through which window(s) 10 the glare may originate. In block 220, glare detection and mitigation system 28 may determine whether the glare persists. For example, after a time period, the position of the sun may have changed requiring a different window 10 to be closed, or allowing previously closed window treatments 14 to be opened in block 224.

At this point it should be understood that the exemplary embodiments describe a system for eliminating glare on a television screen and/or a view of a television system with minimal, if any, outside inputs. That is, the television system itself, after being set up for a particular location, may determine the presence of a glare and take appropriate steps to reduce and/or eliminate the glare to enhance the viewer's viewing experience. It should also be understood that while described as communicating to the window treatments through Bluetooth® protocols, other wireless communication protocols may also be employed. Further, while described as relying on a solar position look-up table and/or perceived gestures, other systems for detecting glare, including light sensors, visual inputs, in-screen sensors and the like may also be employed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A television system comprising:
   a housing including a television screen;
   a glare detector arranged in the housing and configured and disposed to detect an origination point of a glare on one of a television screen and a viewer, the glare detector including a computer readable storage medium having stored therein a look-up table including solar position and orientation information based on geographic location, time of year, and time of day;
   a camera arranged at the housing, the camera being configured and disposed to capture images of one or more viewers;
   an object recognition algorithm operatively associated with the glare detector and the camera, the glare detector being configured and disposed to detect the origination point of the glare based on one or more images of the viewer captured by the camera; and
   a glare remediation system operatively coupled to the glare detector and one or more window covering devices, the glare remediation system being configured and disposed to automatically close the one of the one or more window covering devices at the origination point upon detecting the glare at the one of the television screen and the viewer.

2. The television system according to claim 1, further comprising: a wireless communication device configured and disposed to wirelessly communicate between the glare remediation system and the one or more window covering devices.

3. The television system according to claim 1, wherein the wireless communication device comprises a Bluetooth® communication device.

4. The television system according to claim 1, wherein the one or more window covering devices comprise motorized blinds.

5. A computer-implemented method of detecting and eliminating glare at a television system comprising:

detecting a glare on one of a television screen and a viewer of the television at the television system;

determining an original point of the glare including accessing a computer readable storage medium having stored therein a look-up table including solar position and orientation information based on geographic location, time of year, and time of day;

capturing an image of a viewer through a camera operatively associated with the television system;

evaluating one or more images of the viewer captured by the camera to detect the glare; and automatically closing a window covering device associated with the origination point.

6. The computer-implemented method of claim 5, further comprising:

communicating wirelessly between the television system and the window covering device.

7. The computer-implemented method of claim 6, wherein communicating wirelessly includes establishing a Bluetooth® communication protocol between the television system and the window covering device.

8. The computer-implemented method of claim 5, further comprising: re-opening the window covering device after the glare has passed from the one of the television screen and the viewer.

9. A computer program product for detecting and mitigating glare at one of a television system and a viewer, the computer program product comprising a non-transitory computer readable storage medium having computer readable program instructions embodied therewith, the program instructions being executable by a processor to perform a method comprising:

detecting a glare on one of a television screen and a viewer of the television at the television system;

determining an original point of the glare including accessing a computer readable storage medium having stored therein a look-up table including solar position and orientation information based on geographic location, time of year, and time of day;

capturing an image of a viewer through a camera operatively associated with the television system;

evaluating one or more images of the viewer captured by the camera to detect the glare; and automatically closing a window covering device associated with the origination point.

10. The computer-implemented method of claim 9, further comprising: communicating wirelessly between the television system and the window covering device.

11. The computer-implemented method of claim 10, wherein communicating wirelessly includes establishing a Bluetooth® communication protocol between the television system and the window covering device.

* * * * *